No. 732,094. PATENTED JUNE 30, 1903.
J. MACPHAIL.
CLEANER FOR WHEELED HAY RAKES.
APPLICATION FILED SEPT. 24, 1902.
NO MODEL.
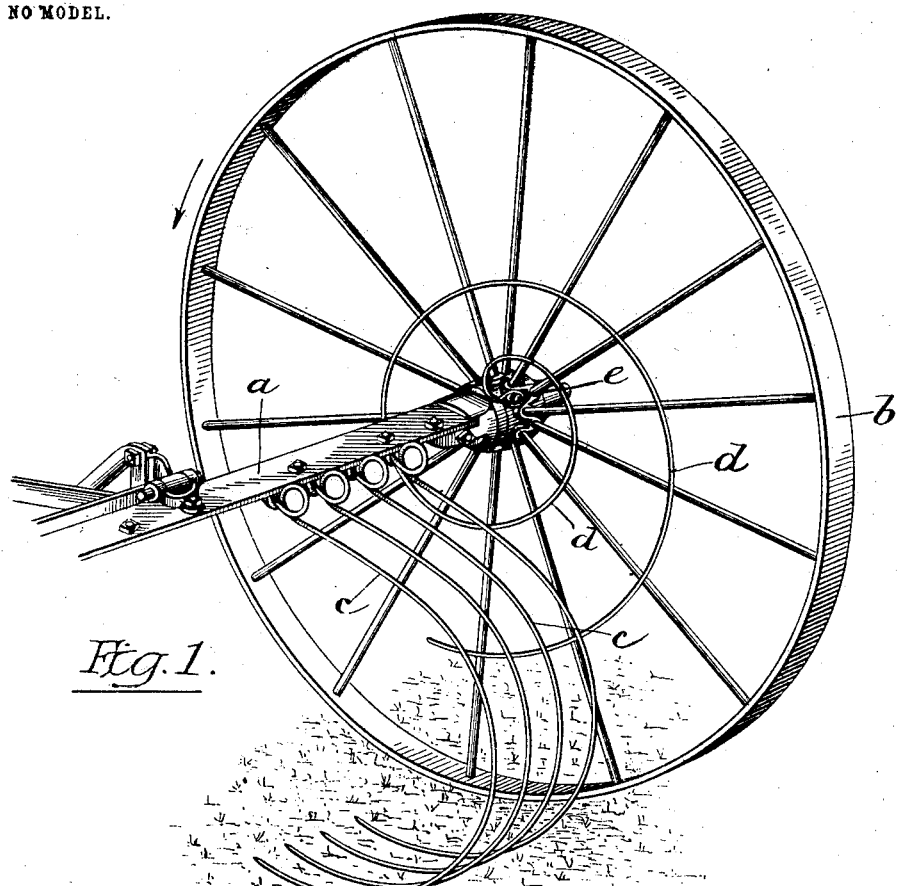
Fig. 1.
Fig. 2.
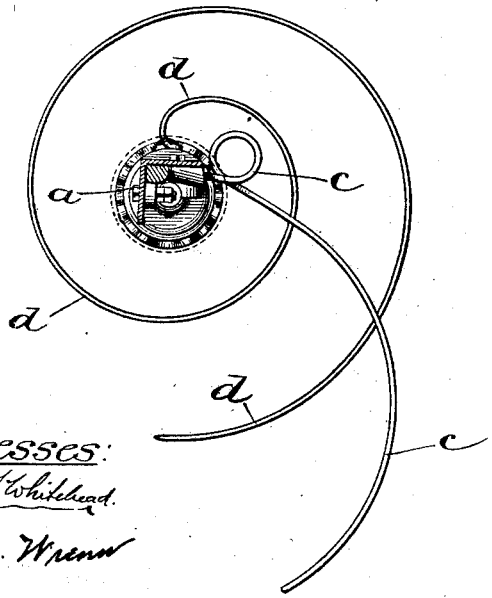
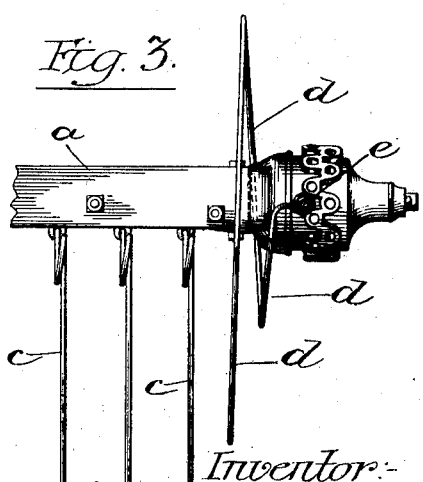
Fig. 3.
Witnesses:
Louis M. F. Whitehead.
J. M. Wrenn
Inventor:-
James Macphail
By his attys
Pennie & Goldsborough No. 732,094. Patented June 30, 1903.

UNITED STATES PATENT OFFICE.

JAMES MACPHAIL, OF BLUE ISLAND, ILLINOIS, ASSIGNOR TO INTERNATIONAL HARVESTER COMPANY, OF CHICAGO, ILLINOIS, A CORPORATION OF NEW JERSEY.

CLEANER FOR WHEELED HAY-RAKES.

SPECIFICATION forming part of Letters Patent No. 732,094, dated June 30, 1903.

Application filed September 24, 1902. Serial No. 124,668. (No model.)

*To all whom it may concern:*

Be it known that I, JAMES MACPHAIL, a citizen of the United States, residing at Blue Island, county of Cook, State of Illinois, have invented certain new and useful Improvements in Cleaners for Wheeled Hay-Rakes; and I do hereby declare the following to be a full, clear, and exact description of the invention, such as will enable others skilled in the art to which it appertains to make and use the same.

The invention contemplates the provision at opposite ends of the rake-head just inside the wheels of an attachment which is believed to be entirely novel—namely, a cleaner or device for preventing the entanglement with the wheels of the hay or other material which accumulates in the rake-teeth approximate to the wheels. So far as I am aware there has been no device heretofore proposed for effecting this object, and I desire, therefore, the appended claims to have an interpretation that will be commensurate with the generic character of the invention.

In the operation of the wheeled hay-rakes, especially those that are automatically dumped, some little difficulty occasionally arises in discharging the load from the fact that the hay as it accumulates in the teeth nearest the wheels becomes entangled with the spokes and other parts of the wheels and gets wound up therein.

The present invention consists in a cleaner which is attached to the wheel-hub or any other part of the wheel and rotates with the wheel so as to continually and gradually push the accumulating hay radially outward with respect to the wheel and preferably also inwardly toward the rake-teeth.

As herein illustrated and described, the invention consists in a coil of spiral spring-wire, one end being secured to the hub of the wheel and the wire being wound spirally in the reverse direction to the wheel's rotation and its outer end being left free. One of these cleaners is attached to each of the wheel-hubs, and as the wheel revolves the gradually-increasing diameter of the spirals pushes the hay radially outward from the center of the wheel and prevents the hay from becoming wrapped around the hub or wound in the spokes of the wheels.

The invention is fully illustrated in the accompanying drawings, wherein—

Figure 1 is a perspective of one end of a wheeled horse-rake looking from the rear. Fig. 2 is a sectional view looking outward toward the wheel, and Fig. 3 is a plan view of the portion of the rake shown in Fig. 1.

Referring to the views, corresponding letters denote the same parts.

The head of the rake is indicated at $a$.

$b$ denotes one of the wheels, and $c$ the rake-teeth.

As here shown, the head of the rake is formed of angle-iron; but it may be constructed in any preferred manner, as the invention is applicable to all rakes however their teeth may be formed.

The cleaner $d$ consists, as here shown, of a spiral spring-wire which is coiled, as shown, and has its inner end secured to the hub of the wheel at $e$ just inside the spokes and between the end tooth on the rake-head and the wheel-spokes. The outer end of the wire coil forming the cleaner is free, and as the coils of the wire increase in diameter they are preferably deflected sidewise toward the rake-teeth in order to push the accumulated hay gradually and continually toward the teeth and laterally away from the wheels. I have here shown the cleaner as consisting of a single continuous wire, wound helically, of coils of gradually-increasing diameter. I have also shown the cleaner as formed of spring-wire. Various modifications of this arrangement may, however, be employed without departing from the spirit or scope of the invention, which consists, broadly, in the employment of a cleaning attachment at the opposite ends of the rake-head inside the wheels for the purpose of automatically pressing the accumulating material radially outward from the center of the wheel.

The construction being as above described, it is believed the operation will be fully understood without further detailed description. The wheels revolve in the direction of the arrow, carrying the cleaners around with them, and the effect of constantly rotating the spirally-wound wire is, as will be readily understood from the illustration, to press the hay which accumulates in the end teeth near the wheels gently and continuously downward and outward with respect to the center of the wheel, and the helical arrangement of the coils, which is best illustrated in Fig. 3, also effects a sidewise movement of the hay away from the wheels toward the rake-teeth. The operation of the rake is thereby considerably improved, and especially in that class of rakes where the teeth are elevated by the rotation of the wheels, so as to automatically dump the load.

Although I have herein shown the end of the cleaner-wire attached to the hub, it is to be understood that it may be attached to any other part of the wheel, and the sidewise deflection of the coils of the cleaner may be omitted, if desired.

Having thus described the invention, what I claim, and desire to secure, is—

1. In a wheeled hay-rake, the combination with the teeth, of revolving means at the end of the rake-head, for pushing the hay inward away from the wheels, so as to prevent the hay from being entangled therewith.

2. In a wheeled hay-rake, the combination with the teeth, of revolving means at the end of the rake-head, for pushing the hay radially outward with respect to the wheels, so as to prevent its entanglement therewith.

3. In a wheeled hay-rake, the combination with the teeth, of a cleaner at the end of the rake-head, said cleaner consisting of a spiral spring-wire secured at one end to the wheel and wound spirally in a substantially vertical plane in the reverse direction to the wheel's rotation, whereby as the wheel revolves the spirals of the cleaner push the hay radially outward and prevent its entanglement therewith.

4. In a wheeled hay-rake, the combination with the teeth, of a cleaner at the end of the rake-head, said cleaner consisting of a spiral spring-wire secured at its inner end to the hub of the wheel and wound helically in the reverse direction to the wheel's rotation so as gradually to approach the teeth with its outer end free, whereby as the wheel revolves the spirals of the cleaner push the hay radially outward with respect to the wheels and toward the rake-teeth, so as to prevent its entanglement with the wheels.

In testimony whereof I affix my signature in presence of two witnesses.

JAMES MACPHAIL.

Witnesses:
CHAS. N. CHAMBERS,
CHAS. W. ALLEN.